United States Patent [19]
Oeda et al.

[11] Patent Number: 6,105,092
[45] Date of Patent: *Aug. 15, 2000

[54] COMPUTER SYSTEM INCLUDING A DEVICE WITH A PLURALITY OF IDENTIFIERS

[75] Inventors: Takashi Oeda; Kiyoshi Honda, both of Yokohama; Naoto Matsunami, Fujisawa; Minoru Yoshida, Odawara, all of Japan

[73] Assignee: Hitachi, Ltd., Tokyo, Japan

[*] Notice: This patent is subject to a terminal disclaimer.

[21] Appl. No.: 09/110,653

[22] Filed: Jul. 7, 1998

Related U.S. Application Data

[63] Continuation of application No. 08/794,908, Feb. 4, 1997, Pat. No. 5,809,279, which is a continuation of application No. 08/031,880, Mar. 16, 1993, Pat. No. 5,634,111.

[30] Foreign Application Priority Data

Mar. 16, 1992 [JP] Japan ................................ 4-58102

[51] Int. Cl.[7] ........................................... G06F 12/06
[52] U.S. Cl. ........................ 710/104; 710/10; 711/173
[58] Field of Search .......................... 710/104, 10, 128, 710/129, 130; 711/173

[56] References Cited

U.S. PATENT DOCUMENTS

| | | |
|---|---|---|
| 3,988,719 | 10/1976 | Whitby et al. . |
| 4,855,905 | 8/1989 | Estrada et al. . |
| 4,922,410 | 5/1990 | Morikawa et al. . |
| 4,924,210 | 5/1990 | Matsui et al. . |
| 4,942,579 | 7/1990 | Goodlander et al . |
| 4,945,512 | 7/1990 | DeKarske et al. . |
| 4,958,341 | 9/1990 | Hemmady et al. . |
| 5,097,414 | 3/1992 | Tone . |
| 5,163,131 | 11/1992 | Row et al. . |
| 5,166,939 | 11/1992 | Jaffe et al. . |
| 5,206,937 | 4/1993 | Goto . |
| 5,303,359 | 4/1994 | Suzuki . |
| 5,321,816 | 6/1994 | Rogan et al. . |
| 5,355,453 | 10/1994 | Row et al. . |
| 5,379,184 | 1/1995 | Barraza et al. . |
| 5,410,680 | 4/1995 | Challa et al. . |
| 5,434,722 | 7/1995 | Bizjak et al. ........................ 360/69 |
| 5,519,844 | 5/1996 | Stallmo . |

FOREIGN PATENT DOCUMENTS

| | | |
|---|---|---|
| 63-115224 | 5/1988 | Japan . |
| 63-276626 | 11/1988 | Japan . |
| 3127114 | 5/1991 | Japan . |
| WO9103788 | 3/1991 | WIPO . |
| WO9113404 | 9/1991 | WIPO . |

OTHER PUBLICATIONS

NCR 53C710 SCSI I/O Processor Data Manual Revision 1.0, Microelectronic Products Division Colorado Springs, 1990, Preliminary, pp. 1–98.

(List continued on next page.)

*Primary Examiner*—Paul R. Myers
*Attorney, Agent, or Firm*—Antonelli, Terry, Stout & Kraus, LLP

[57] ABSTRACT

A host computer is connected with a magnetic disk storage device by a SCSI bus. In the magnetic disk storage device, a plurality of partitions are set in a disk drive unit and have device identifiers (ID's) respectively allocated thereto as SCSI ID's=1, 2 and 3, which are supported by a disk controller. When the host computer has acquired the control of the SCSI bus through an arbitration and has selected, for example, the partition with the device identifier SCSI ID=1, the disk controller permits the host computer to access the partition in response to the selection. Since the partitions are different in attributes, properties etc., they seem to be magnetic disk storage devices that at separate from one another when viewed from the host computer. Thus, the single magnetic disk storage device can be managed as a plurality of storage devices of different nature.

9 Claims, 6 Drawing Sheets

OTHER PUBLICATIONS

Microsoft MS–DOS, Operating Version Sysetm 5.0, User's Guide and Reference, 1991, pp. 147–159.

An AFS™–Based Mass Storage System at the Pittsburgh Supercomputing Center, Daniel Nydick, et al., 1991, pp. 117–122.

Filtering of network addresses in real time by sequential decoding, P. Wolstenholme, 1988, pp. 55–59.

ANSI, X3.1131–1986, pp. 14–17, 25–41.

European Search Report.

Standard Search Report.

NCR 53C710 SCSI, 53C710–1 I/O Processor Data Manual, 1992, pp. 1–iv, 1–1–1–4, 2–1–2–13, 3–1–3–5, 4–1–4–35, 5–1–5—5–17, A–1–A–5, B–1–B–3, I–1–I–2, 1–3 of 3.

"Storage Computer Switching Fabric", 1989, 1990, 1991, 1992 and 1993, Storage Computer Corporation, p. 12.

COMPUTER SYSTEM INCLUDING A DEVICE WITH A PLURALITY OF IDENTIFIERS

This application is a continuation of Ser. No. 08/794,908, filed Feb. 4, 1997, now U.S. Pat. No. 5,809,279, which is a continuation of Ser. No. 08/031,880, filed Mar. 16, 1993, now U.S. Pat. No. 5,634,111.

BACKGROUND OF THE INVENTION

1. Field of the Invention

The present invention relates to a computer system and external storage therefor. In particular, the computer system includes devices or nodes which have peculiar device ID's (identifiers) and are connected with one another through an interface or network, such as SCSI, IPI (Intelligent Peripheral Interface) or Ethernet, for exchanging data, commands, messages etc.

2. Related Art

As stipulated in, for example, ANSI X3. 131—1986, "Small Computer System Interface (SCSI)" issued by ANSI (American National Standards Institute), the peripheral devices of a prior-art computer system have peculiar device ID's, respectively. The LBA (Logical Block Address) lengths of the devices, the types of the devices (such as a random access device, a sequential access device, a rewritable device, and a read only device), etc. are fixed for the respective devices by standards. In addition, although not standardized, management for the data reliabilities of the individual peripheral devices, management for backing up the devices, etc. are carried out for the respective devices at the request of the OS (operating system) of a host computer.

The prior-art technique is incapable of or has difficulty coping with a case, for example, where a magnetic disk storage device having a large capacity is divided into a plurality of partitions with the intention of managing the partitions as separate storage areas having different characteristics (in points of the LBA lengths, the backup management, etc.). Accordingly, expensive and large-sized magnetic disk storage devices need to be installed for respective sorts of data of different properties, such as ordinary file data and image data.

Further, there is no consideration for sharing the peripheral devices between a plurality of hosts. The exclusive control between the hosts in the case of a shared magnetic disk storage device cannot be performed on the device side, and is inevitably entrusted to the management of the host side. For this reason, it is possible that some operations of the user of the computer system may bring about a situation where data held in the magnetic disk storage device are destroyed.

Further, in case of a network including therein a node which is physically connected in the same network, but which uses a communication protocol differing from that of the other nodes, it is difficult for such a single node to use two communication protocols properly and therefore the single node has difficulty communicating with the other nodes. Therefore, expensive and large-sized magnetic disk storage devices must be installed for the respective different communication protocols.

SUMMARY OF THE INVENTION

The first object of the present invention is to solve the problems described above, and to provide a computer system which is permitted to handle data having different properties using an identical peripheral device, and also an external storage device which serves as the peripheral device.

The second object of the present invention is to provide a computer system which is permitted to share a peripheral device among a plurality of computers.

The third object of the present invention is to provide a computer system which is permitted to share a peripheral device between computers having different communication protocols.

In order to accomplish the first object, the computer system according to the present invention is constructed so that peculiar device IDs (identifiers) are respectively allocated to a computer and the peripheral device, and that a plurality of device IDs are allocated to the peripheral device.

Also, in order to accomplish the first object, the external storage device according to the present invention is constructed so that a plurality of partitions are set therein, and that device IDs are allocated to the respective partitions.

In order to accomplish the second object, the computer system according to the present invention is constructed so that particular device IDs are respectively allocated to the plurality of computers and peripheral devices, and that a plurality of device IDs are allocated to the specified peripheral device.

In order to accomplish the third object, the computer system according to the present invention is constructed so that device IDs are allocated to the respective computers, and that device IDs differing for the respective communication protocols are allocated to the peripheral device.

In accordance with the first-mentioned construction of the present invention, when the computer has selected the peripheral device by designating any of the plurality of device IDs allocated to the peripheral device, this peripheral device responds to the computer, and the computer can access the peripheral device in regard to the designated device ID. Accordingly, the peripheral device appears to the computer to be a number of devices, in fact as many as the number of allocated device IDs, and the computer can handle the data of the different properties by the use of the peripheral device.

With the second-mentioned construction, the device IDs are respectively allocated to the partitions of the external storage device. Therefore, when the computer has selected the external storage device by designating one of the device IDs, it can access the partition having the designated device ID. Accordingly, the partitions form separate devices when viewed from the computer, and the data with properties differing for the respective partitions can be written into and read out of these partitions.

With the third-mentioned construction, when the separate computers have selected the specified peripheral device by designating the pertinent ones of the plurality of allocated device IDs, they can access the peripheral device in regard to the designated device IDs. In this case, when the plurality of device IDs allocated to the single peripheral device are individually held in correspondence with the separate computers, the peripheral device becomes capable of performing the exclusive control between the computers. Moreover, when at least two computers are allowed to designate a predetermined one of the device IDs, they can share the peripheral device by using this predetermined device ID.

With the fourth-mentioned construction, the device IDs for the respective communication protocols are allocated to the peripheral device. Therefore, no matter which communication protocol the computer having selected the peripheral device may have, the computer can access the peripheral device in regard to the device ID designated by this computer. Accordingly, the plurality of computers having different communication protocols can share such a peripheral device.

PREFERRED EMBODIMENTS OF THE INVENTION

Now, embodiments of the present invention will be described with reference to the drawings.

Figure 1:
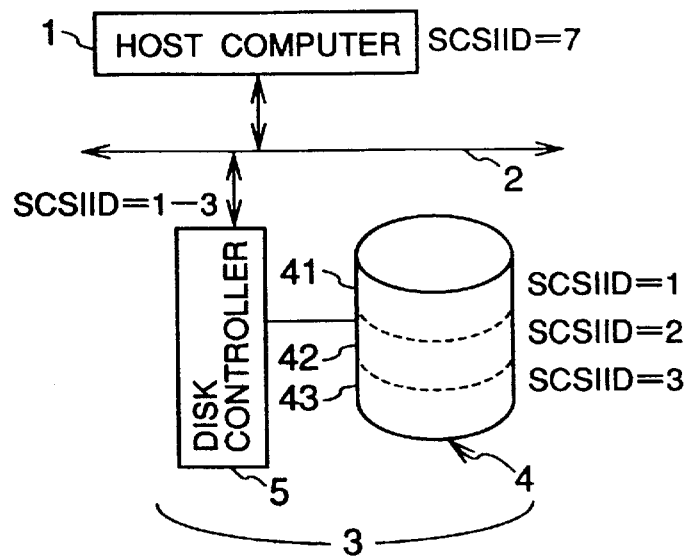
FIG. 1 is a block diagram showing an embodiment of a computer system according to the present invention.

FIG. 1 is a block diagram illustrative of one embodiment of a computer system according to the present invention. The computer system of this embodiment comprises a host computer 1, a SCSI bus 2, and a magnetic disk storage device 3. The magnetic disk storage device 3 includes a disk drive unit 4 divided into partitions 41, 42 and 43, and a hard disk controller 5.

As illustrated in the figure, in this embodiment the host computer 1 and the magnetic disk storage device 3, which serves as external storage for the computer 1, are connected by the bus 2 conforming to the SCSI standard which has recently become the standard for peripheral equipment interfaces for small computer systems. The magnetic disk storage device 3 is configured of the hard disk controller 5 and the disk drive unit 4.

Here, the prior art will be explained for the sake of comparison. In a prior-art computer system having such architecture, the host computer 1 and the magnetic disk storage 3 have respective device IDs (identifiers) such as SCSI ID=1 for the former and SCSI ID=2 for the latter. The host computer 1 issues comands and exchanges commands, messages and data with the magnetic disk storage device 3 after an "arbitration phase" for acquiring the control of the bus 2 to be an initiator and a "selection phase" for selecting the magnetic disk storage device 3 which is the opposite party of the host computer 1. By way of example, when the host computer 1 is to read data out of the magnetic disk storage device 3, the arbitration phase is first executed so that the host computer 1 may acquire the bus control of the SCSI bus 2 and occupy this bus 2. Subsequently, the selection phase is executed so that the magnetic disk storage device 3 may be designated as the target device. On this occasion, the magnetic disk storage device 3 knows that the host computer 1 is about to select the storage device 3 itself, from the device ID sent by the host computer 1 (actually, a transmission line corresponding to the device ID is electrically driven). Then, the magnetic disk storage device 3 responds to the device ID, thereby informing the host computer 1 of the fact that the storage device 3 is ready to accept a command. The selection phase is completed by the response.

This embodiment of the present invention is quite similar to the prior art in that the peculiar device ID (here, SCSI ID=7) is set for the host computer 1, and that the host computer 1 undergoes the arbitration and executes the selection. However, it differs from the prior art in that the opposite device, here, the magnetic disk storage device 3 has a plurality of device IDs. More specifically, as shown in FIG. 1, in the magnetic disk storage device 3, the disk drive unit 4 is divided into partitions, for example, the three partitions 41, 42 and 43, for which the different device IDs (here, SCSI ID's=1, 2 and 3) are respectively set. Thus, when viewed from the host computer 1, the magnetic disk storage device 3 seems to be three separate magnetic disk storage devices connected to the SCSI bus 2. Since three or more devices do not use one bus simultaneously in accordance with the SCSI standards, one device can have a plurality of device IDs allocated thereto and be made to look like a plurality of devices.

Figure 2:
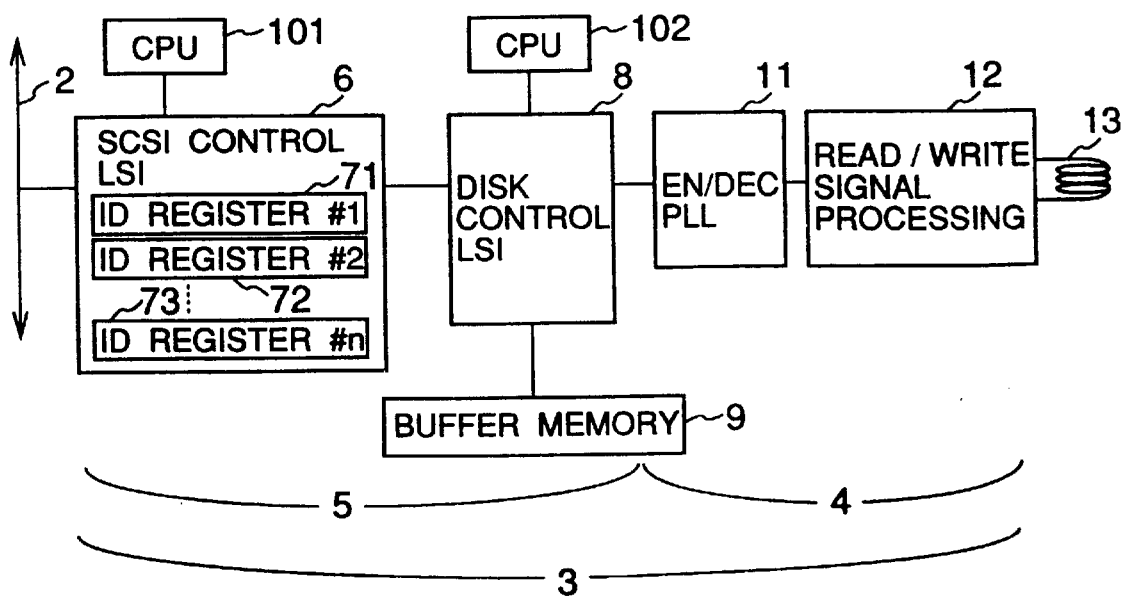
FIG. 2 is a block diagram showing a practical example of a magnetic disk storage device depicted in FIG. 1.

FIG. 2 is a block diagram showing a practical example of the magnetic disk storage device 3 depicted in FIG. 1. This magnetic disk storage device 3 includes a SCSI control LSI (large-scale integrated circuit) 6 which is configured of ID registers 71, 72, . . . and 73. It also includes a disk control LSI 8, a buffer memory 9, CPUs 101 and 102, a PLL/ENDEC (phase-locked loop circuit/encode-decode circuit) 11, a read/write signal processing circuit 12, and a magnetic recording/reproducing head 13.

In the illustrated example, the disk controller 5 is configured of the SCSI control LSI 6, the disk control LSI 8, the CPU's 101 and 102 which control the respective LSI's 6 and 8 by the use of microprograms, and the buffer memory 9 which is a data transferring buffer. In this regard, a SCSI control LSI included in a disk controller in the prior art is provided with only one register for storing one device ID of its own therein. In the selection phase, the SCSI control LSI in the prior art performs a control in which a device ID requested by the host computer is compared with its own device ID stored in the register. When the device IDs are coincident, the SCSI control LSI responds to the request of the host computer and prepares for subsequently accepting a command from the host computer, but when the IDs are not, it does not coincident respond.

In contrast, the SCSI control LSI 6 shown in FIG. 2 is provided with the plurality of ID registers 71, 72 and 73 in which the device IDs (here, SCSI ID's=1, 2 and 3) set for the partitions of the disk drive unit 4 are respectively stored. In the selection phase executed by the host computer 1, the SCSI control LSI 6 compares a device ID requested by the host computer 1, with the device IDs stored in any of the ID registers 71~73. When the requested device ID coincides with any of the stored device IDs, the SCSI control LSI 6 acknowledges the coincidence and responds to the request of the host computer 1. On this occasion, the SCSI control LSI 6 notifies the device ID requested by the host computer 1, to the CPU 101 controlling this LSI 6, and it prepares for interpreting a command to be subsequently sent from the host computer 1, in accordance with the called device ID. Likewise, the SCSI control LSI 6 notifies the device ID requested by the host computer 1, to the disk control LSI 8 and the CPU 102 controlling this LSI 8. The notification is necessary for instructing the disk drive 4 to execute an appropriate process or for appropriately controlling the buffer memory 9 after having interpreted the command such as the conversion of an LBA (logical block address) into a PBA (physical block address).

Actually, the SCSI control LSI 6 need not be provided with the plurality of ID registers. When the number of device IDs in the whole system is limited to eight as in the SCSI standards, the SCSI control LSI 6 may well be provided with one ID register of 8 bits, the stages of which are respectively held in correspondence with the separate device IDs so as to store one device ID with one bit.

The protocol of the SCSI standards consists of the following seven phases:

1) Arbitration Phase

An initiator (a term in the SCSI standards, signifying a device on a side on which a command is issued) acquires the control of an SCSI bus. When a plurality of initiators have simultaneously intended to acquire the bus control, the priority sequence of the initiators is determined on the basis of the IDs thereof.

2) Selection Phase

The initiator having acquired the bus mastership designates the ID of a target (a term in the SCSI standards, signifying a device on a side on which a command is executed). The designation is done by making "true" that data line among eight data lines which corresponds to the ID No. of the target. The target recognizes that it has been selected. Thenceforth, it undergoes a phase transition until a bus free status is restored at the end of the execution of the command.

3) Command Phase

The initiator sends the command to the target.

4) Data Phase

In the case of a command, such as read or write, which requires the transfer of data, the target changes its phase from the command phase to the data phase, and it awaits the data transfer from the initiator for the write command or transfers the data to the initiator for the read command.

5) Status Phase

The target reports the result of the command execution to the initiator.

6) Message Phase

The target sends a message indicative of the completion of the command to the initiator.

7) Bus Free Phase

After sending the message, the target restores the SCSI bus to the bus free status which is an unused status.

Figure 7:
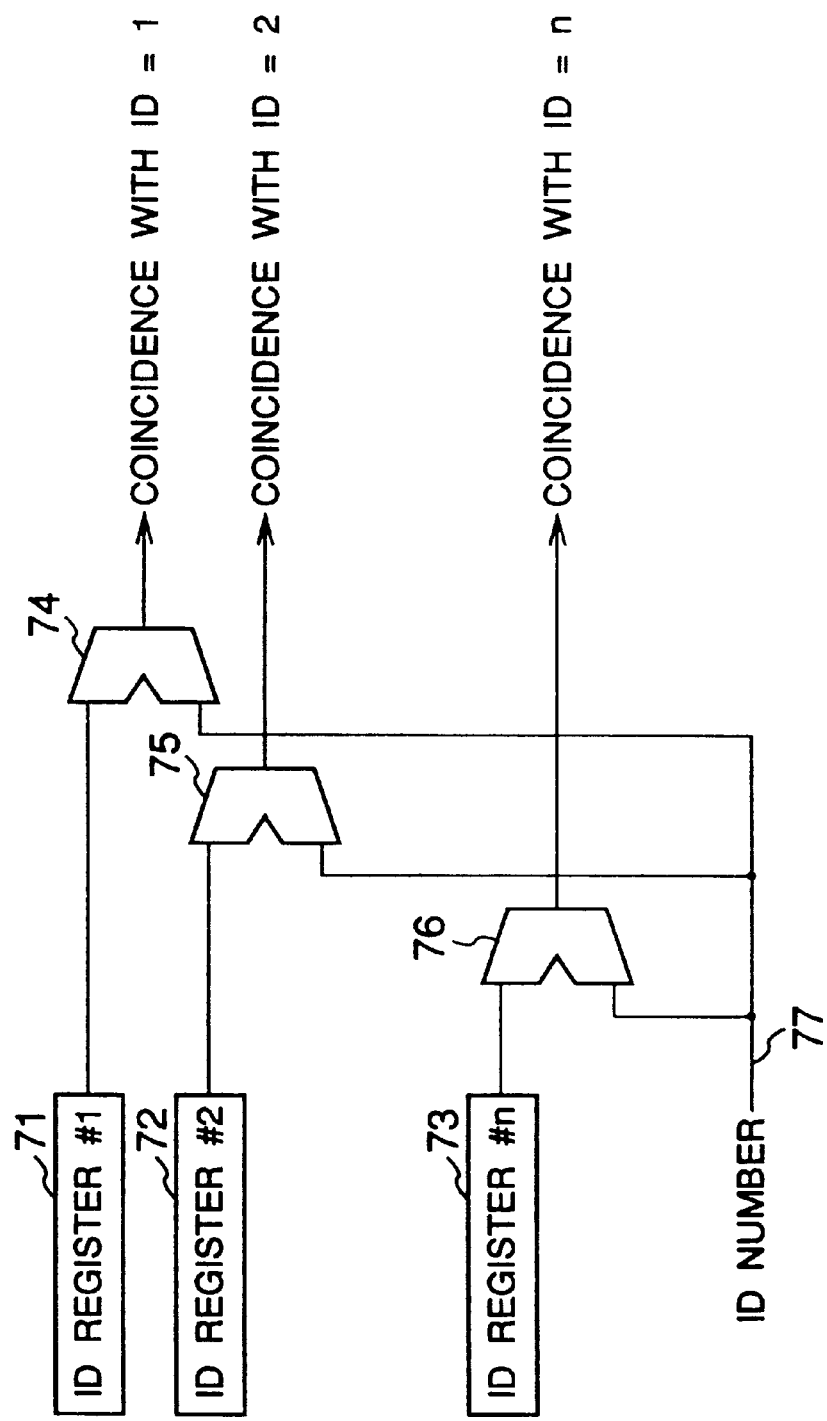
FIG. 7 is a block diagram showing the arrangement of the principal portions of a SCSI control LSI (large-scale integrated circuit) depicted in FIG. 2.

FIG. 7 illustrates the arrangement of the principal portions of the SCSI control LSI 6 in this embodiment.

This SCSI control LSI 6 includes comparators 74~76 in correspondence with the respective ID registers #1~#n (71, 72 and 73). The comparators 74~76 compare the ID No. asserted in the selection phase, with the contents of the respective ID registers 71~73. When the ID No. has coincided with any of the contents, the SCSI control LSI 6 generates an ID coincidence signal at the corresponding comparator. Then, the LSI 6 informs the CPU 101 of the ID No. having coincided, in other words, the device ID requested by the host computer 1. The CPU 101 executes the subsequent processing of the command, using mode information (parameters such as the logical block length of the device) set for every device ID. As a preferable example, the mode information is held in a nonvolatile memory, such as disk or ROM, when the power source of the computer system is off, whereas it is held in the working memory (not shown) of the CPU 101 during the operation of the computer system. By way of example, the working memory is provided in the CPU chip 101, in the disk control LSI 8, in the buffer memory 9, or in the SCSI control LSI 6.

It is now assumed that the device identifier SCSI ID=1 has been requested by the host computer 1. When a read command has been subsequently sent from the host computer 1, the disk control LSI 8 and CPU 102 of the disk controller 5 interpret the device ID (=1) of the device having responded in the selection phase, and an LBA designated in the command by the host computer 1. Next, the disk controller 5 converts the LBA into a PBA which expresses a physical position in the disk drive 4. Further, data are read out of the partition 41 of the disk drive 4 by the use of the buffer memory 9 and the EN/DEC PLL 11 as well as the read/write signal processing circuit 12. In this embodiment, the recording area of a magnetic disk (not shown) is divided into the partitions 41~43, and the data are read out in a subarea corresponding to the partition 41 by the magnetic recording/reproducing head 13. A write command is executed similarly. A PBA is obtained from the device ID of the device having responded in the selection phase, and an LBA designated in the command by the host computer 1. Data are written in the partition corresponding to the PBA.

Here, in both the read and write operations, the single magnetic disk storage device 3 is endowed with different attributes (concerning, for example, an LBA length, the management of the buffer memory, and a processing method on the occurrence of an error) for the respective partitions 41, 42 and 43 which correspond to the device IDs (SCSI IDs=1, 2 and 3) set in this storage device 3. In the prior art, such an attribute is set for every device by a mode select command and cannot be changed for respective partitions. Since, as stated above, the different attributes are afforded to the respective partitions, the LBA lengths and the buffer memory management methods can be set so as to maximize effective transfer rates in accordance with the characteristics of data which are to be stored in the partitions. Besides, the buffer memory management methods and the error processing methods can be set in accordance with the required reliabilities of the data.

In the SCSI standards, the above expedient can be substituted by allocating different LUN's (logical unit numbers) to the respective partitions 41~43.

As thus far described, in this embodiment, the single magnetic disk storage device 3 seems to be three magnetic disk storage devices when viewed from the host computer 1. Thus, the partition 43 of the device identifier SCSI ID=3, for example, can be set as a partition for storing therein data created by the user of the computer system, with only this partition being backed up at a fixed time every day, and the partition 41 of the device identifier SCSI ID =1, for example, can be set as a partition for storing the OS (operating system) of the computer system therein, whereby the logically separate partitions are respectively managed with ease. Alternatively, the partition 41 and the partition 42 of the device identifier SCSI ID=2, for example, can be respectively assigned as a file area for ordinary files and as a file area for a real time control, or the partitions 41 and 42, for example, can be respectively assigned as a file area for ordinary files and as a file area dedicated to motion pictures, whereby the block lengths, the architectures of file systems (such as directory management systems), data protection attributes, etc. are optimized for the respective partitions with ease.

Figure 3:
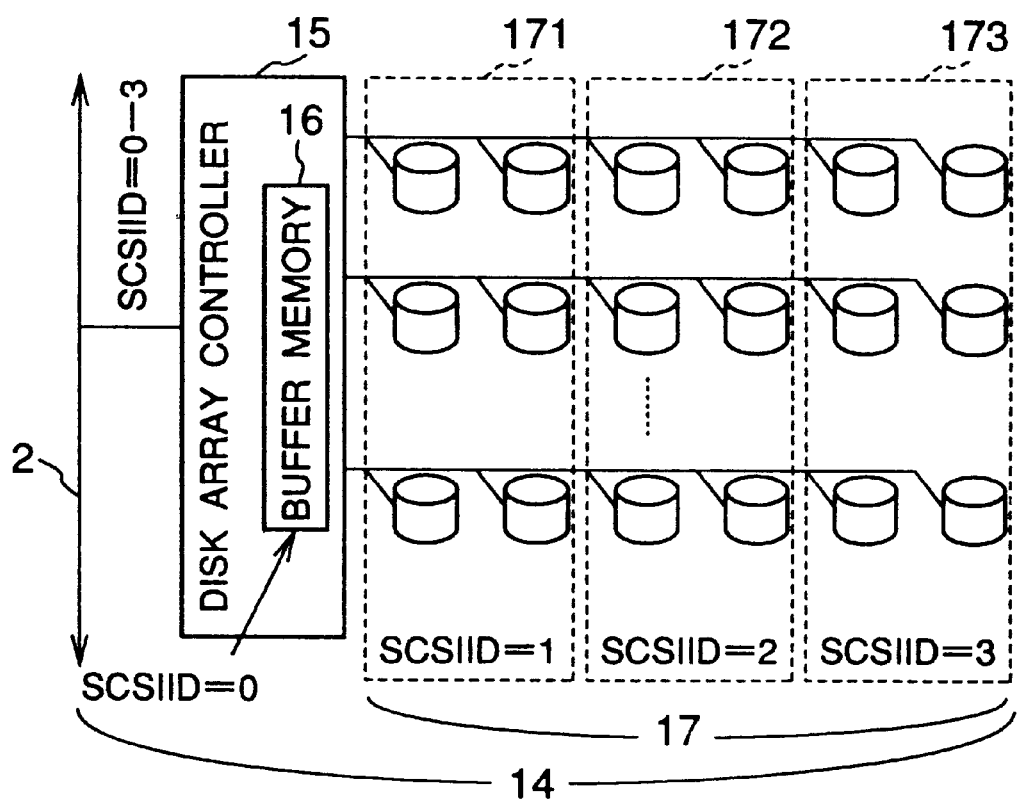
FIG. 3 is a block diagram showing another embodiment of the computer system according to the present invention.

FIG. 3 is a block diagram illustrative of another embodiment of the computer system according to the present invention. Numeral 14 indicates a disk array storage device, which includes a disk array controller 15, a buffer memory 16, and a disk array 17 divided into partitions 171, 172 and 173.

This embodiment employs the disk array storage device 14. In FIG. 3, the disk array storage device 14 supports four SCSI identifiers (SCSI IDs=0, 1, 2 and 3), which correspond respectively to the buffer memory 16, partition 171, partition 172 and partition 173. As in the foregoing embodiment shown in FIG. 1, a host computer undergoes an arbitration and executes a selection. The disk array controller 15 judges which of the four devices including the buffer memory 16 and the three partitions 171, 172 and 173 corresponds to a command or data sent via the SCSI bus 2 from the host computer, on the basis of a device ID requested by the host computer. Subsequently, it performs processing for the corresponding device.

Although the four devices with the different device IDs, namely, the buffer memory 16 and the partitions 171~173 are collectively managed by the disk array controller 15, they are storage areas which have characteristics differing from one another. By way of example, the characteristics are as stated below. The buffer memory 16 is a semiconductor disk, the capacity of which is usually small, but which exhibits a very high response rate. Besides, the partition 171 is "RAID(Redundant Arrays of Inexpensive Disks)1" which is a disk array of mirror disk configuration. Since data are overwritten into the disk array 171, the reliability thereof is very high. In addition, the partition 172 is "RAID3" which is a disk array for high-speed data transfer. The disk array 172 is suited to quick transfer of long data such as the data of a motion picture, or the data of a gigantic array such as which would be handled in a scientific or technological computation. Further, the partition 173 is "RAID5" which is a disk array for heavy transactions. The disk array 173 is suitable for an application, such as database or network server, in which a data length to be handled is comparatively short, but the number of I/O (input/output) processes per unit time is large. When viewed from the host computer, all four devices 16 and 171~173 seem to be independent of one another. As described in the preceding embodiment, therefore, the attributes of the individual devices 16 and 171~173, concerning the block length, the buffer memory management, the error processing method, the backup method, etc. can be optimized and set with ease, and the disk array controller 15 can manage these attributes with ease. To this end, which of the devices 16 and 171~173 is to be accessed may be judged on the basis of the device ID designated in the selection phase by the host computer, so as to distribute a command process to the judged device. The attributes of the respective devices, such as the block lengths, may be held within the disk array controller 15 (for example, in the internal register of the disk control LSI 8 or the register of the CPU 102 as shown in FIG. 2) so as to be used in interpreting the command of the host computer.

Figure 4:
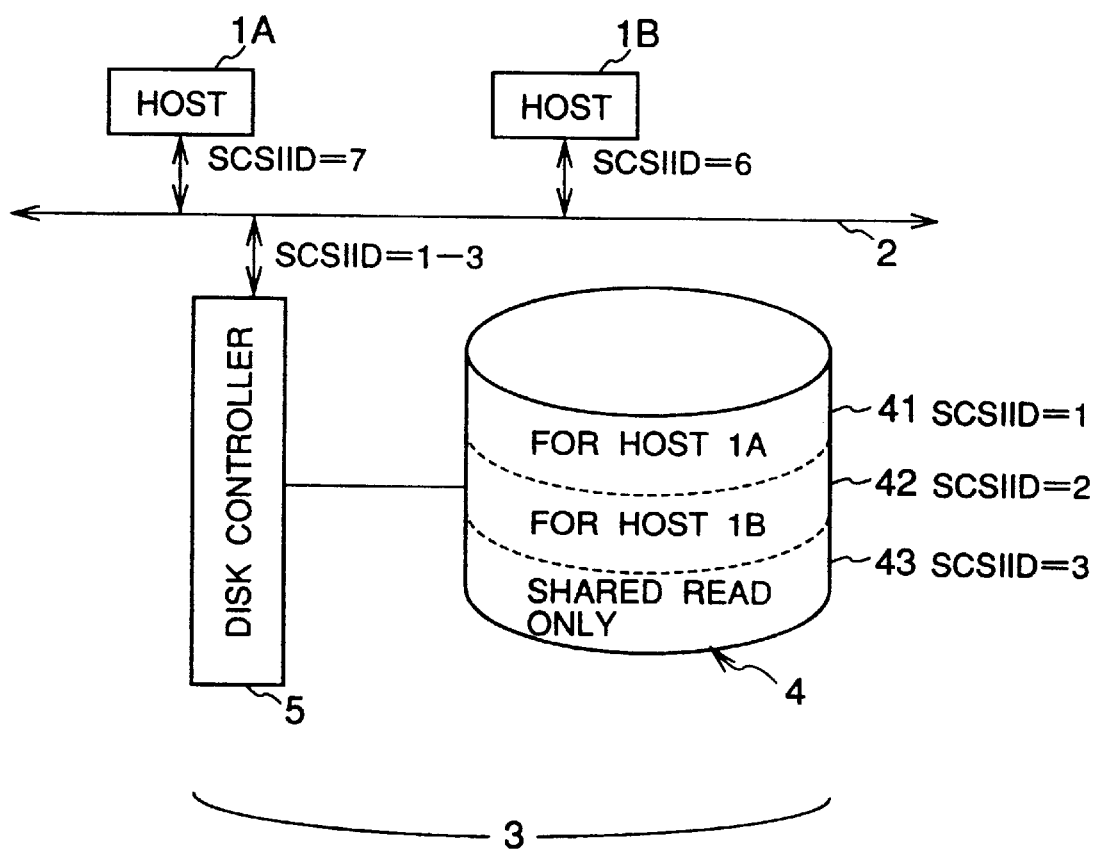
FIG. 4 is a block diagram showing still another embodiment of the computer system according to the present invention.

FIG. 4 is a block diagram illustrative of still another embodiment of the computer system according to the present invention. In FIG. 4, symbols 1A and 1B denote host computers, and portions corresponding to those of the embodiment shown in FIG. 1 are denoted by the same numerals.

The embodiment shown in FIG. 4 includes a single magnetic disk storage device 3 which is shared by the plurality of host computers 1A and 1B.

Referring to FIG. 4, the magnetic disk storage device 3 is connected to the two host computers 1A and 1B through an SCSI bus 2. It includes a disk controller 5, and a disk drive unit 4 in which three partitions 41, 42 and 43 are set. Here in this embodiment, the partition 41 (SCSI ID=1) is assigned to the host computer 1A, the partition 42 (SCSI ID=2) is assigned to the host computer 1B, and the partition 43 (SCSI ID=3) is assigned to both the host computers 1A and 1B so as to be shared.

Even in the prior art, a single magnetic disk storage device is sometimes shared by a plurality of host computers. In such a case, however, the exclusive control between the host computers must be responsibly managed on the host computer side. Therefore, erroneous operation by the user of a computer system might incur the problem of, e.g., data destruction arising in such a manner that, after data have been written into a certain area by one of the host computers, data are written into the same area by the other host computer.

On the other hand, in this embodiment, the host computer 1A is set by the OS (operating system) of the computer system beforehand so as to access only the partitions 41 and 43 respectively having the SCSI IDs=1 and 3, as stated above. Then, the host computer 1A can request only the SCSI IDs=1 and 3, and it is prevented from erroneously accessing the partition 42 which is an area dedicated to the host computer 1B. Besides, the partition 43 is a read only area, and it is readily set so as to be shared by the host computers 1A and 1B. Although the partition 43 can be accessed by both host computers 1A and 1B, it undergoes no data destruction since it is a read only area. Further, when the disk controller 5 performs the exclusive control between an access from the host computer 1A and an access from the host computer 1B, it need not consider the difference of the device IDs (here, SCSI ID's=7 and 6) of the respective host computers 1A and 1B, but it may merely judge the pertinent ones of the device. IDs (SCSI IDs=1, 2 and 3) of the respective partitions 41, 42 and 43 selected by the host computers 1A and 1B. Processing which is executed for interpreting a command by the disk controller 5 is similar to that explained in conjunction with FIG. 2.

Figure 5:
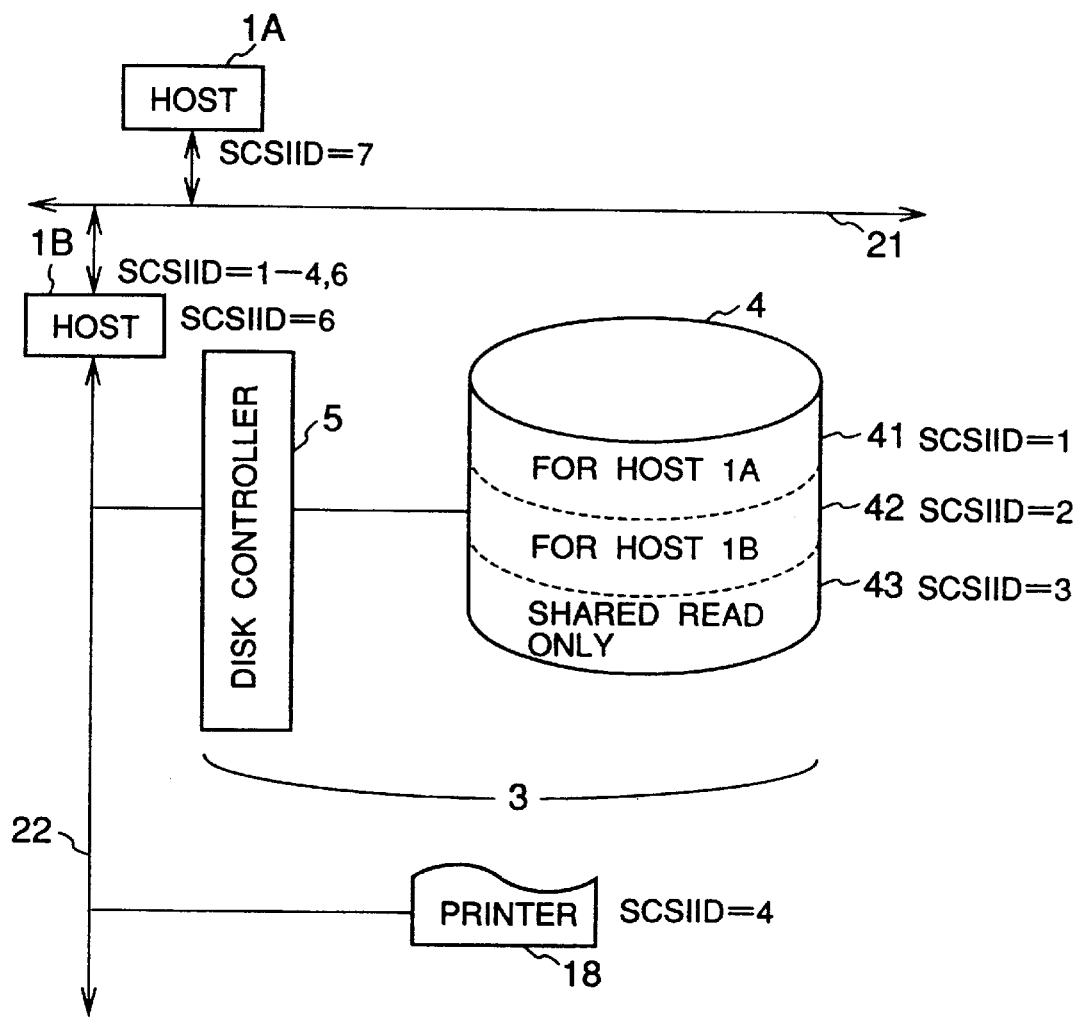
FIG. 5 is a block diagram showing yet another embodiment of the computer system according to the present invention.

FIG. 5 is a block diagram illustrative of yet another embodiment of the computer system according to the present invention. In FIG. 5, numerals 21 and 22 indicate SCSI buses, and numeral 18 indicates a printer. Portions corresponding to those of the embodiment shown in FIG. 4 are denoted by the same numerals.

The computer system of this embodiment has such an architecture including a plurality of host computers which are interconnected by a SCSI bus, and peripheral devices which are connected to only one of the host computers by another SCSI bus.

Referring to FIG. 5, host computers 1A and 1B are interconnected by the SCSI bus 21, and a magnetic disk storage device 3 and the printer 18 are connected to the host computer 1B by the SCSI bus 22. Here, as in the embodiment shown in FIG. 4, the magnetic disk storage device 3 includes a disk controller 5 and a disk drive unit 4 divided into partitions 41, 42 and 43 having respective SCSI IDs=1, 2 and 3. The device ID of the printer 18 is set at SCSI ID=4. The host computer 1B supports the device ID (SCSI ID=6) of its own, the device IDs (SCSI ID's=1, 2 and 3) of the partitions 41, 42 and 43, and the device ID (SCSI ID=4) of the printer 18, while the host computer 1A supports the device ID (SCSI ID=7) of its own.

In the prior art, when the host computer 1A is to access any of the peripheral devices such as the magnetic disk storage device 3 and the printer 18 which are located below the host computer 1B as stated above, this host computer 1A undergoes an arbitration so as to acquire the control of the SCSI bus 21. Thereafter, the host computer 1A selects the host computer 1B of the SCSI ID=6 and causes the host computer 1B to run a program (which is a program complying with the command of the host computer 1A). Subsequently, the host computer 1A sends the host computer 1B a command for designating the device ID of the magnetic disk storage device 3 or the printer 18 and the operation of the corresponding device, and the host computer 1B executes the command on the basis of the above program so as to access the designated device by the use of the device ID thereof. That is, when the host computer 1A is to access the predetermined device, the host computer 1B accesses the device instead. Therefore, accesses from the host computer 1A to the devices such as the magnetic disk storage device 3 and the printer 18 are troublesome. Moreover, the dedicated program for operating the host computer 1B as stated above needs to be installed in this host computer 1B.

On the other hand, in this embodiment, the host computer 1B bears, not only the SCSI ID=6 which is its own device ID, but also the SCSI ID=4 of the printer 18 and the SCSI IDs=1, 2 and 3 of the respective partitions 41, 42 and 43 of the magnetic disk storage device 3. When the host computer 1A sends one of the device IDs, for example the SCSI ID=1, to the host computer 1B, the host computer 1B executes an operation equivalent to its operation responsive to the instruction of accessing the partition 41 of the magnetic disk storage device 3, and it undergoes an arbitration for the SCSI bus 22 and selects the partition 41 as in the preceding embodiment, thereby accessing this partition 41.

In this manner, according to this embodiment, the host computer 1A can access either of the magnetic disk storage device 3 and the printer 18, which are not directly connected thereto, equivalently through the host computer 1B (that is, as if the host computer 1B were not existent) merely by sending the device ID of the device to-be-accessed directly without the necessity of calling the host computer 1B. It is also possible for the host computers 1A and 1B to share the single magnetic disk storage device 3 in the same manner as in the embodiment shown in FIG. 4.

Of course, in this case, the host computer 1B must respond to any accesses to the devices of the SCSI IDs=1, 2, 3 and 4 on the SCSI bus 21 and then deliver a command or data from the host computer 1A to the SCSI bus 22. Otherwise, it must respond to an access to the host computer 1A of the SCSI ID=7 on the SCSI bus 22 and then deliver a command or data to the SCSI bus 21. Such requisites, however, are not objectionable as explained below. In general, in a case where remote printing, file transfer or the like is to be executed via a network, a command or data is interpreted tracing back to an application layer, whereupon access to a printer, a magnetic disk storage device or the like is controlled. In contrast, according to this embodiment, merely the command of substantially the same content and in the same format may be transferred, so that processing and labor are greatly simplified and saved.

By the way, even when the SCSI bus 21 is replaced with a network such as Ethernet in FIG. 5, the host computer 1A can access any of the peripheral devices such as the magnetic disk storage device 3 and printer 18, which are not directly connected to this host computer 1A physically, equivalently through the host computer 1B. Also, the single magnetic disk storage device 3 can be shared by the host computers 1A and 1B (while realizing the exclusive control which does not burden the host computers) as in the embodiment shown in FIG. 4. In this case, however, the host computer 1B must accept and deliver commands and data in which the differences of communication protocols for the SCSI bus 21 and Ethernet are considered.

Figure 6:
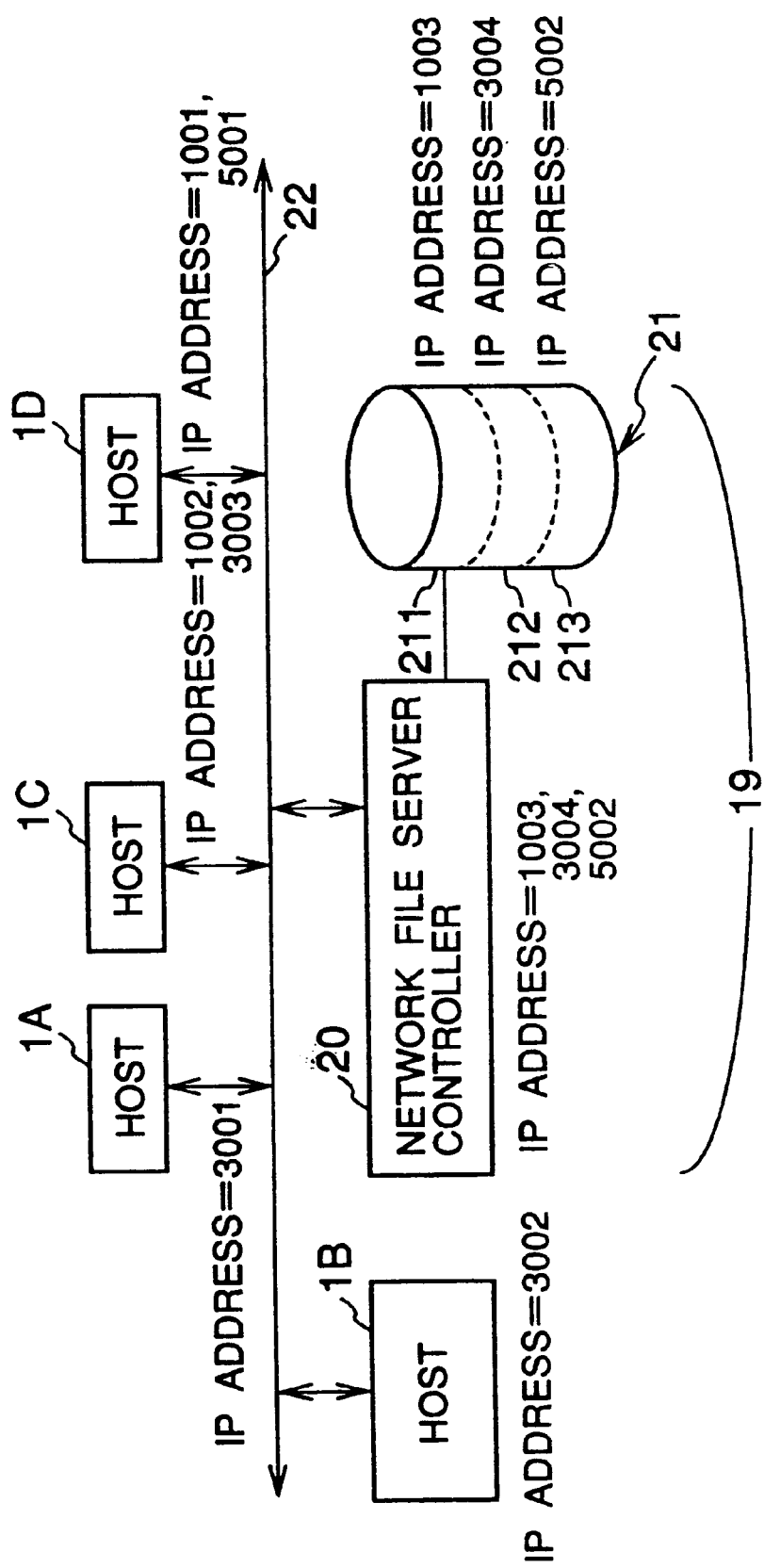
FIG. 6 is a block diagram showing a further embodiment of the computer system according to the present invention.

FIG. 6 is a block diagram illustrative of a further embodiment of the computer system according to the present invention. The computer system comprises host computers 1A~1D, a network file server 19, and Ethernet 22 as a network. The network file server 19 includes a network file server controller 20, and a magnetic disk storage device 21 which is divided into partitions 211~213.

This embodiment includes a plurality of host computers which differ in, for example, communication protocols are connected by a network file server and a network.

Here in FIG. 6, the host computers 1A and 1B are MS-DOS (Microsoft Disk Operating System) machines, the IP (internet protocol) addresses of which are respectively set at 3001 and 3002. The host computer 1C is a shared machine for UNIX and MS-DOS, and it is set at an IP address of 1002 for UNIX and an IP address of 3003 for MS-DOS. The host computer 1D is a shared machine for UNIX and the OS (operating system) of a large-sized general-purpose computer, and it is set at an IP address of 1001 for UNIX and an IP address of 5001 for the large-sized general-purpose computer. In addition, the network file server controller 20 supports IP addresses=1003, 3004 and 5002, which correspond respectively to the partition 211 for UNIX, the partition 212 for the large-sized general-purpose computer, and the partition 213 for MS-DOS in the magnetic disk storage 21. Besides, the host computers 1A~1D are connected to the network file server controller 20 through Ethernet 22 which is one example of the network.

In such an architecture, the host computers 1A~1D have different OSs and different network protocols (communication protocols), and the partitions 211~213 of the magnetic disk storage device 21 are respectively held in correspondence with the OSs and network protocols which differ from one another. That is, the network file server controller 20 of the network file server 19 supports the IP addresses=1003, 3004 and 5002 and controls the magnetic disk storage device 21 as follows: The partition 211 of the storage device 21 set as the partition for UNIX can be accessed only with the OS and network protocol of UNIX. The partition 212 set as the partition for the large-sized general-purpose computer can be accessed only with the network protocol of the OS for the large-sized general-purpose computer. The partition 213 set as the partition for MS-DOS can be accessed only with the network protocol of MS-DOS.

When the host computers 1C and 1D operate in conformity with UNIX, they can request to the network file server controller 20 for the IP address=1003. Besides, when the host computer 1D operates in conformity with the OS for the large-sized general-purpose computer, it can similarly request the IP address=5002.

Due to the control stated above, when the host computer 1C, for example, is to access the magnetic disk storage device 21 of the network file server 19 in conformity with MS-DOS, it requests the network file server controller 20 to select the IP address=5002 through Ethernet 22. Then, the network file server controller 20 controls the magnetic disk storage device 21 in order that the host computer 1C may access the partition 213 of the magnetic disk storage device 21 with the network protocol of MS-DOS.

In this manner, the identical network file server 19 can be easily shared among the host computers which have the different network protocols and OSs.

Incidentally, when the host computers 1A and 1C are to communicate or transfer data therebetween, the IP address for MS-DOS (=3003) set for the host computer 1C is designated, whereby the network protocol for MS-DOS is automatically used between the computers 1A and 1C. In the communications or data transfer between the host computers 1C and 1D, the IP addresses for UNIX (=1002 and 1001) are respectively designated for these computers 1C and 1D, and the network protocol for UNIX is used. Thus, the different sorts of machines can be connected with ease.

As described above in detail, according to the present invention, a plurality of device IDs are allocated to each device, whereby partitions corresponding to the respective device IDs can be endowed with attributes differing from one another, and the attributes can be optimized in accordance with the characteristics of data which are to be handled in the individual partitions.

In addition, an exclusive control, which is required when a single peripheral device is shared among a plurality of host computers, can be performed with ease, the destruction of data attributed to an erroneous operation can be prevented, and the settings of backup managements, etc. are facilitated.

Further, the control of accesses to partitions having different performances in, e.g., a disk array can be performed with ease.

Still further, part of a transfer buffer included in a disk controller can be set as a semiconductor disk and accessed from a host computer easily without altering a protocol.

Yet further, a host computer can equivalently and easily access a peripheral device which is connected to only another host computer.

Moreover, even in case of a network file server, the single file server can be easily shared among different sorts of machines which differ in file systems and network protocols, and accesses can be efficiently controlled in a network in which host computers supporting a plurality of OSs and protocols are coexistent.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A disk array storage device, comprising:
   a disk array assigned a plurality of Small Computer System Interface (SCSI) IDs; and
   a disk array controller connectable to a host computer via an SCSI bus and to said disk array,
   wherein said disk array controller receives an SCSI-ID from the host computer, and responds to the host computer if the received SCSI-ID coincides with any of the SCSI-IDs assigned to said disk array,
   wherein said disk array is divided into a plurality of partitions, and said disk array controller allocates a different SCSI-ID to each of said plurality of partitions.

2. A disk array storage device, comprising:
   a disk array assigned a plurality of Small Computer System Interface (SCSI) IDs; and
   a disk array controller connectable to a host computer via an SCSI bus and to said disk array,
   wherein said disk array controller receives an SCSI-ID from the host computer, and responds to the host computer if the received SCSI-ID coincides with any of the SCSI-IDs assigned to said disk array, and
   wherein said disk array is divided into a plurality of partitions, and a different SCSI-ID is assigned to each of said plurality of partitions.

3. A disk array storage device according to claim 2, wherein each of said partitions include portions of multiple disks of the disk array.

4. A disk array storage device according to claim 3, wherein each of said partitions is assigned one of RAID levels.

5. A disk storage device responsive to a host computer, comprising:
   a disk drive unit; and
   a controller for controlling said disk drive unit,
   wherein said disk storage device has a plurality of Small Computer System Interface (SCSI) IDs, and responds to said host computer when a SCSI ID received from said host computer coincides with any of said plurality of SCSI IDs, and
   wherein said disk drive unit is divided into a plurality of partitions, and a different SCSI ID is assigned to each of said plurality of partitions.

6. In a disk storage device having a disk drive unit and a controller for controlling said disk drive unit, a method of responding to a host computer from said disk storage device comprising the steps of:
   assigning a different SCSI ID to each of a plurality of partitions of said disk drive unit; and
   responding to said host computer when a SCSI ID received from said host computer coincides with any of said plurality of SCSI IDs.

7. In a disk storage device having a disk drive unit which has a plurality of partitions, a method of responding to a host computer comprising the steps of:
   receiving a first SCSI ID from said host computer to access one of said partitions;
   responding to said host computer upon receipt of said first SCSI ID;
   receiving a second SCSI ID from said host computer to access another one of said partitions; and
   responding to said host computer upon receipt of said second SCSI ID,
   wherein said first SCSI ID is different from said second SCSI ID.

8. A disk storage device responsive to a host computer, comprising:
   a disk drive unit; and
   a controller for controlling said disk drive unit,
   wherein said disk storage device has a plurality of Small Computer System Interface (SCSI) IDs, and responds to said host computer if a SCSI ID received from said host computer coincides with any of said plurality of SCSI IDs, and
   wherein said disk drive unit is divided into a plurality of partitions, and a different SCSI ID is assigned to each of said plurality of partitions.

9. In a disk storage device having a disk drive unit and a controller for controlling said disk drive unit, a method of responding to a host computer from said disk storage device comprising the steps of:
   assigning a different SCSI ID to each of a plurality of partitions of said disk drive unit; and
   responding to said host computer if a SCSI ID received from said host computer coincides with any of said plurality of SCSI IDs.

* * * * *